United States Patent
Okada (10) Patent No.: US 11,162,922 B2
(45) Date of Patent: Nov. 2, 2021

(54) LIQUID CHROMATOGRAPH DEVICE

(71) Applicant: SHIMADZU CORPORATION, Kyoto (JP)

(72) Inventor: Kohji Okada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 623 days.

(21) Appl. No.: 16/054,522

(22) Filed: Aug. 3, 2018

(65) Prior Publication Data

US 2020/0041464 A1 Feb. 6, 2020

(51) Int. Cl.
*G01N 30/16* (2006.01)
*G01N 30/02* (2006.01)

(52) U.S. Cl.
CPC ....... *G01N 30/16* (2013.01); *G01N 2030/027* (2013.01)

(58) Field of Classification Search
CPC ............. G01N 30/16; G01N 2030/027; G01N 30/8668; G01N 30/8672; G01N 30/8658
USPC ....................................................... 73/61.55
See application file for complete search history.

(56) References Cited

U.S. PATENT DOCUMENTS

| | | | | |
|---|---|---|---|---|
| 5,132,012 A | * | 7/1992 | Miura ................ | G01N 30/6095 210/198.2 |
| 2003/0113936 A1 | * | 6/2003 | Yamamoto ......... | G01N 30/8624 436/173 |
| 2008/0110232 A1 | * | 5/2008 | Miyagawa ......... | G01N 30/8665 73/1.02 |
| 2012/0058568 A1 | * | 3/2012 | Sasaki ................ | G01N 30/84 436/161 |
| 2017/0097328 A1 | * | 4/2017 | Yoshioka ........... | G01N 30/8644 |

FOREIGN PATENT DOCUMENTS

| | | | | |
|---|---|---|---|---|
| JP | 60-239669 A | | 11/1985 | |
| JP | 61-118659 A | | 6/1986 | |
| JP | 6-300742 A | | 10/1994 | |
| JP | 61118659 A | * | 6/1998 | ............. G01N 30/44 |
| JP | 2014-206497 A | | 10/2014 | |

OTHER PUBLICATIONS

Paula Hong et al., "Simplifying Methods Transfer: Novel Tools for Replicating Your Established Methods on an ACQUITY Arc System", [online], Waters Corporation in United States, [searched on Feb. 5, 2016], the Internet, pp. 1-6.

Communication dated Jan. 29, 2019 from Japanese Patent Office in counterpart JP Application No. 2016-020483.

* cited by examiner

*Primary Examiner* — Marrit Eyassu
(74) *Attorney, Agent, or Firm* — Sughrue Mion, PLLC (57) ABSTRACT

Before start of analysis, a user inputs pipe capacity difference relative to reference pipe capacity and separation conditions, such as a mobile phase flow rate. A control unit calculates retention time shift from the pipe capacity difference and the flow rate. The control unit controls sample injection and data processing units so as to start collection of chromatogram data when a correction time has passed from the time point of sample injection in the case in which the value of the retention time shift is a positive value, and to perform sample injection when a correction time has passed from the time point at which the collection of chromatogram data is started in the case in which the value of the retention time shift is a negative value. Retention time shift caused by difference in the pipe capacity is corrected even when the mobile phase flow rate is different.

2 Claims, 5 Drawing Sheets

STANDARD PIPE CAPACITY

Fig. 5B

LARGE PIPE CAPACITY

Fig. 5C

SMALL PIPE CAPACITY

LIQUID CHROMATOGRAPH DEVICE

TECHNICAL FIELD

The present invention relates to a liquid chromatograph device, and more particularly to a technique of controlling the analysis operation in the liquid chromatograph device.

BACKGROUND ART

In a general liquid chromatograph (hereinafter referred to as "LC") device, a mobile phase stored in a mobile phase container is suctioned by a liquid supply pump and supplied to a column via an injector. When a liquid sample is injected into the mobile phase from the injector at a predetermined timing, the liquid sample is introduced into the column by moving along the flow of the mobile phase, and various kinds of components in the liquid sample are separated in the time direction while passing through the column and are eluted from a column exit. The components contained in the eluate are detected, for example, by a detector such as a photodiode array (PDA) detector, and a detection signal corresponding to the concentration of each component is obtained. In a data processing unit, a chromatogram which shows a relationship between the elapsed time and the signal intensity obtained in the detector is created based on this detection signal. Since a peak corresponding to each component is observed on the chromatogram, the components in the liquid sample can be specified (identified) based on the time (retention time) at which the peak top of the peak appears.

Generally, in the data processing unit, chromatogram data are collected using, as a base point, the point of time at which the liquid sample is injected into the mobile phase from the injector (strictly speaking, the point of time at which a command for injecting the liquid sample is issued to the injector from a control unit that controls operation of the injector). Accordingly, the sample injection time point is the time zero of the chromatogram, that is, the retention time zero. When the same device is used and the separation conditions (for example, flow velocity of the mobile phase, temperature of the column, and the like) are the same, the retention time for the same component is approximately the same. In other words, the reproducibility of the retention time is ensured.

However, when an installation environment of the device is different, the retention time of the peak for the same component may differ even when the same sample is analyzed under the same separation conditions. Typically, shift in the retention time is generated when the capacity of the mobile phase flow path (pipe) from the injector to the column entrance or the capacity of the mobile phase flow path (pipe) from the column exit to the detector is different. In particular, in an LC device of recent years, the liquid supply pump, injector (automatic sampler), column oven, detector, and the like are individually made into units, and a configuration is often adopted such that a user selects suitable units in accordance with an object of analysis or the like, so as to construct a system. Although such a system has a large versatility and extensibility, the length of the pipe that connects between the units varies depending on the installation environment of it, which often causes a shift in the retention time.

When the retention time for the same component differs in each chromatogram as described above, it is difficult to identify the component under the unified reference (relationship between the retention time and the component). Further, it will be difficult to determine whether the contained components are the same or not or which peak derives from a different component by comparing a plurality of chromatograms. Although it is possible to equalize the retention time for the same component in different devices by adjusting the separation conditions such as the flow rate of the mobile phase, such setting of the separation conditions is tangled and cumbersome for the user.

For example, Patent Literature 1 discloses that, with respect to two chromatograms that are different in the retention time, a major peak having a high signal intensity is selected from each chromatogram and, after the amount of shift of the retention time is measured from the difference, the time axis of one chromatogram is shifted by that amount, whereby identification of the peak of the same component can be made. A similar technique is also disclosed in Non Patent Literature 1. According to such a technique, it is possible to correct the difference in retention time of the same component on two chromatograms obtained under the same separation conditions. However, when analysis is made in different devices, it is not often the case that the analysis is made with totally identical set values of the separation conditions, particularly the mobile phase flow rate, so that there is a strong desire for equalization of the retention time of the same component even when the mobile phase flow rate is different.

CITATION LIST

Patent Literature

Patent Literature 1: JP S60-239669 A (See the upper right column on page 2 and lower left column on page 4)

Non Patent Literature 1: "Simplifying Methods Transfer: Novel Tools for Replicating Your Established Methods on an ACQUITY Arc System", [online], Waters Corporation in United States, [searched on Feb. 5, 2016], the Internet

SUMMARY OF INVENTION

Technical Problem

The present invention has been made in view of the aforementioned problem, and an object of the present invention is to provide an LC device capable of equalizing the retention time for the same component without adjusting the separation conditions among different devices or when configuration is changed in the same device.

Solution to Problem

Thus, the present invention aimed at solving the aforementioned problem provides a liquid chromatogram device including a liquid supply unit for supplying a mobile phase, a sample injection unit for injecting a sample into the supplied mobile phase, a column for temporally separating components contained in the sample, a detection unit for detecting the components in an eluate that is eluted from an exit of the column, and a signal processing unit for creating a chromatogram based on a detection signal sent from the detection unit, wherein the liquid chromatogram device further includes:
a) a pipe information setting unit configured to allow a user to set pipe information related to a capacity of a pipe from the sample injection unit to an entrance of the column and/or a pipe from the exit of the column to the detection unit;

b) a retention time shift calculation unit configured to calculate a shift of retention time from a reference retention time that is given when the capacity of the pipe is a predetermined reference capacity, based on the pipe information and a mobile phase flow rate that is determined as a separation condition at a time of an analysis; and c) a control unit configured to control the sample injection unit and the signal processing unit so as to adjust a timing at which the sample is injected into the mobile phase in the sample injection unit and a timing at which the retention time is assumed to be zero on the chromatogram that is created in the signal processing unit, in accordance with the shift of retention time that is calculated by the retention time shift calculation unit.

The user calculates a pipe capacity from the inner diameter or length of the pipe from the sample injection unit to the column entrance and/or the pipe from the column exit to the detection unit, or experimentally determines the pipe capacity, for example, by an operation such as measuring the amount of liquid that fills the inside of the pipe. Further, the user inputs and sets the calculated pipe capacity by the pipe information setting unit. Alternatively, instead of the value of the pipe capacity itself, the difference between the calculated pipe capacity and the pipe capacity serving as a reference may be input and set. The retention time shift calculation unit calculates a shift of retention time from a reference retention time that is given when the pipe capacity is a predetermined reference capacity, based on the pipe information set by the pipe information setting unit and the mobile phase flow rate that is set as one of the separation conditions at that time. There are a case in which this retention time shift is a positive value (the case of a shift in the direction such that the time is delayed) and a case in which this retention time shift is a negative value (the case of a shift in the direction such that the time goes back). In other words, when the actual pipe capacity is smaller than the reference capacity, the retention time shift is a negative value, whereas when the actual pipe capacity is larger than the reference capacity, the retention time shift is a positive value In actually performing the analysis, the control unit controls the respective operations of the sample injection unit and the signal processing unit so as to adjust a timing at which the sample is injected into the mobile phase in the sample injection unit and a timing at which the retention time is assumed to be zero on the chromatogram that is created in the signal processing unit, in accordance with the retention time shift that has been calculated as described above.

Specifically, for example, when the retention time shift is a negative value, the control unit causes the signal processing unit to start obtainment of a detection signal so that the retention time will be zero on the chromatogram prior to sample injection, and controls the sample injection unit so as to start execution of the sample injection at the time point at which a correction time corresponding to the retention time shift passes from the signal obtainment start time point. Conversely, when the retention time shift is a positive value, the control unit controls the sample injection unit so as to execute sample injection and thereafter causes the signal processing unit to start obtainment of a detection signal so that the retention time will be zero on the chromatogram at the time point at which a correction time corresponding to the retention time shift passes from the sample injection time point. This allows obtainment of a chromatogram in which the shift of retention time has been corrected, irrespective of whether the pipe capacity is larger or smaller than the reference pipe capacity.

Also, as one preferable embodiment of the liquid chromatograph device according to the present invention, a configuration may be adopted in which the pipe information setting unit enables selection of which of the pipe information and the shift of retention time is to be set, and sets the pipe information in correspondence with the selection of setting of the pipe information and sets the shift of retention time in correspondence with the selection of setting of the shift of retention time; and the control unit uses the set shift of retention time for control in place of the shift of retention time calculated by the retention time shift calculation unit when the shift of retention time is set by the pipe information setting unit.

According to this configuration, the user can directly input and set the shift of retention time without determining the pipe capacity by calculation or actual measurement. Needless to say, in that case, the time axis of the chromatogram is shifted by the amount of correction time corresponding to the retention time shift that has been input and set.

Advantageous Effects of Invention

The liquid chromatograph device according to the present invention makes it possible to obtain a chromatogram with equalized retention time for the same component without adjusting the separation conditions if only the pipe information related to the capacity of the pipe is input when, for example, the length of the pipe that connects between the sample injection unit and the column or the pipe that connects between the column and the detection unit differs in a plurality of different devices (systems) or when the length of these pipes is changed within the same device. This allows identification of components under a unified reference. Also, it is possible to easily find whether the same component is contained or not by comparing a plurality of chromatograms.

DESCRIPTION OF EMBODIMENTS

An LC device, which is one embodiment of the present invention, is hereinafter described with reference to the attached drawings.

Figure 1:
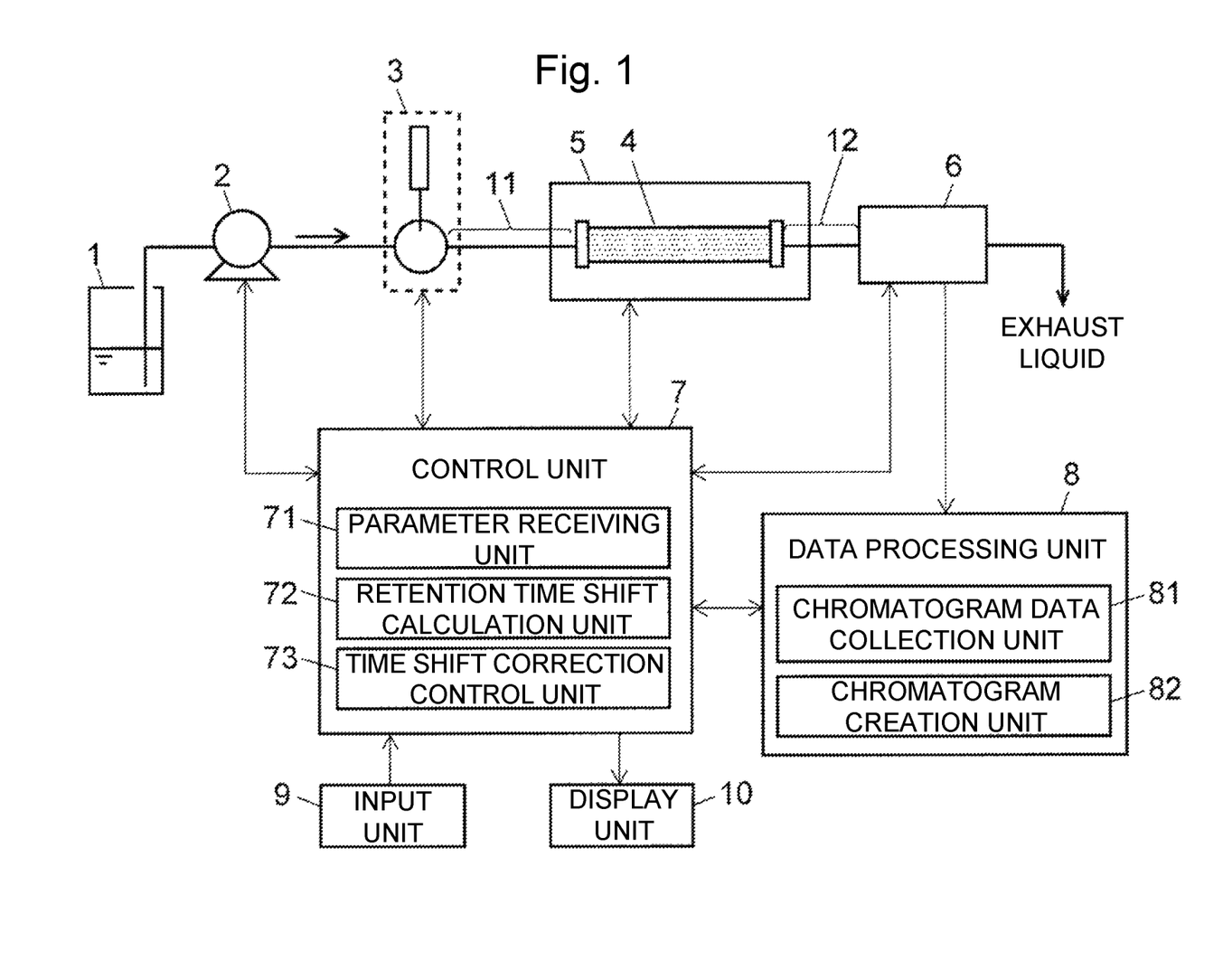
FIG. 1 is a schematic configuration diagram of an LC device according to one embodiment of the present invention.
Figure 2A:
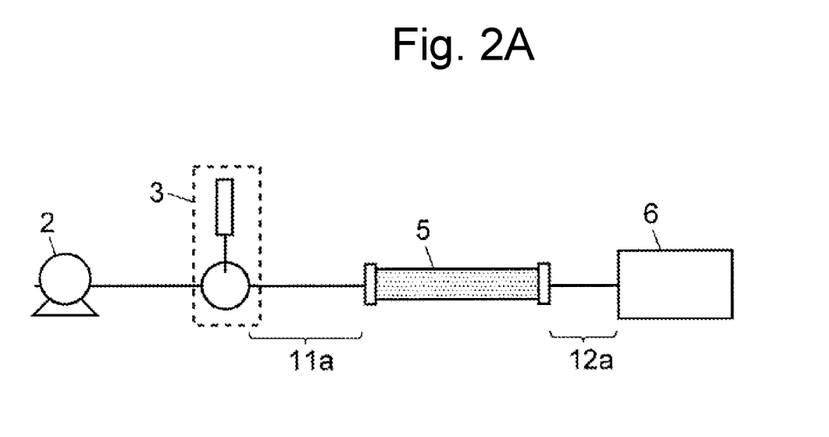
FIGS. 2A and 2B are schematic diagrams of configurations having different pipe capacities in the LC device shown in FIG. 1.
Figure 2B:
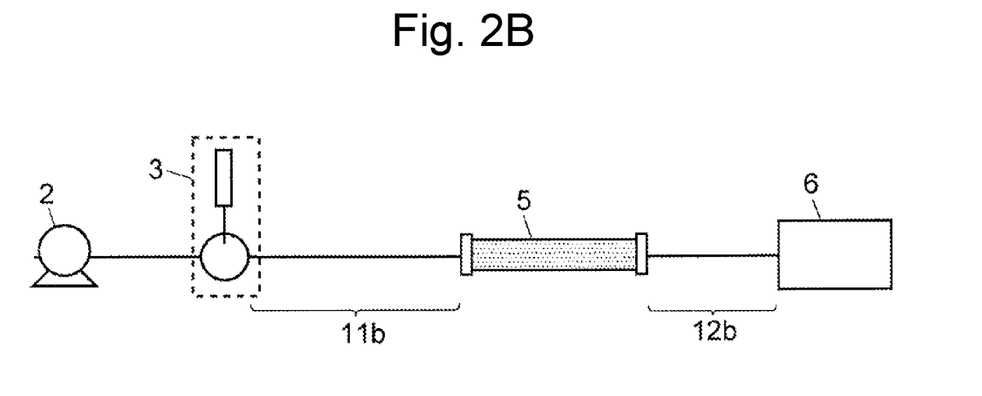
Figure 3:
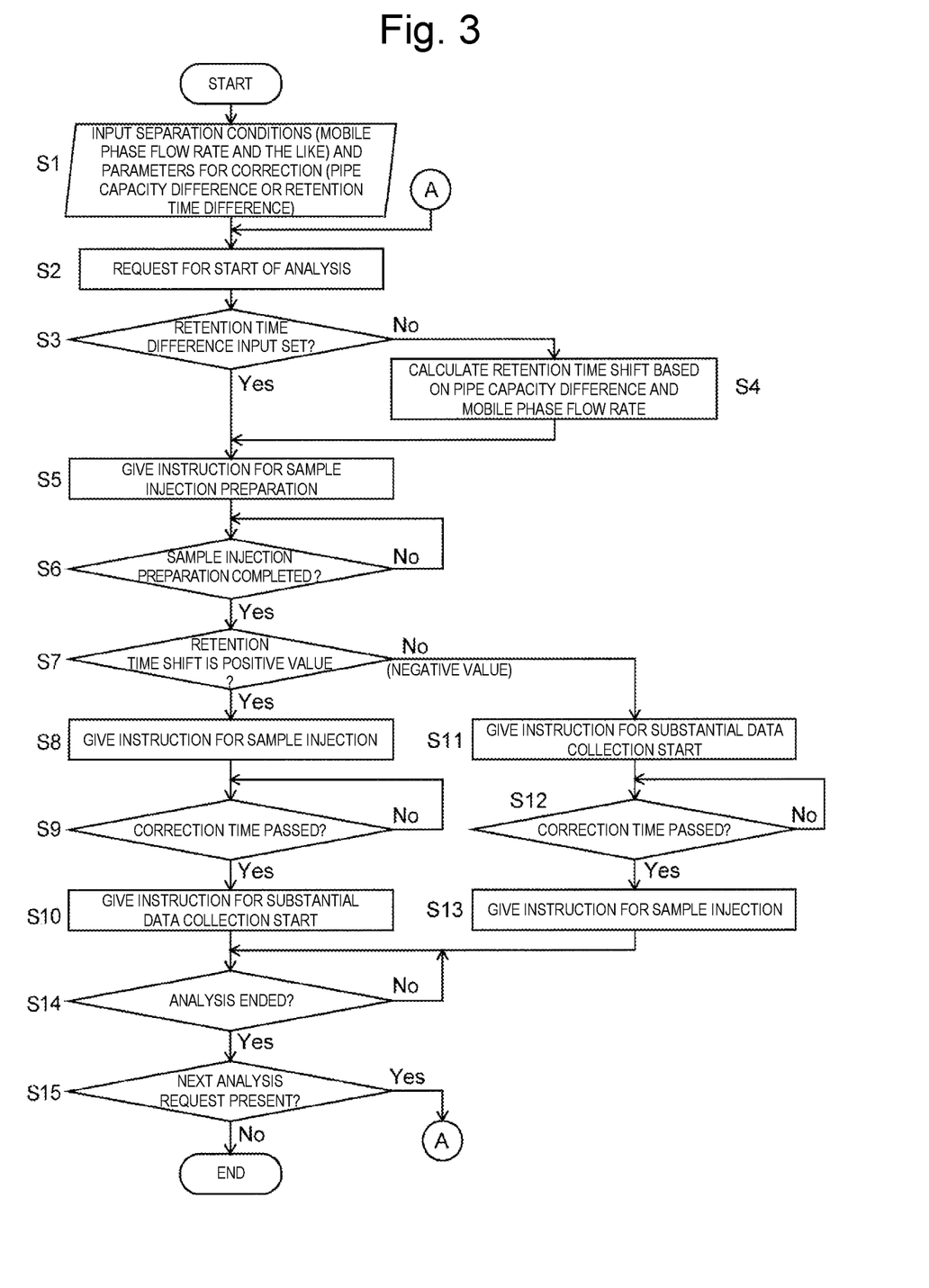
FIG. 3 is a flowchart of a retention time shift correction process in the LC device of the present embodiment.
Figure 4A:
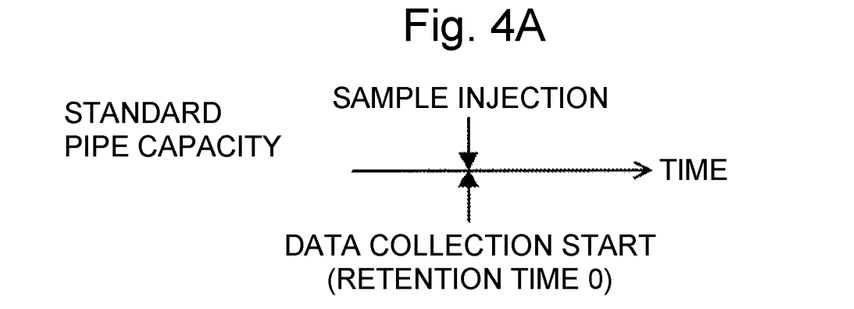
FIGS. 4A to 4C are explanatory diagrams of the retention time shift correction process in the LC device of the present embodiment.
Figure 4B:
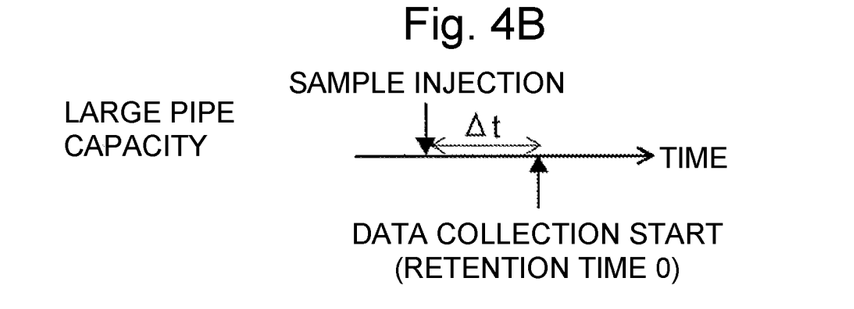
Figure 4C:
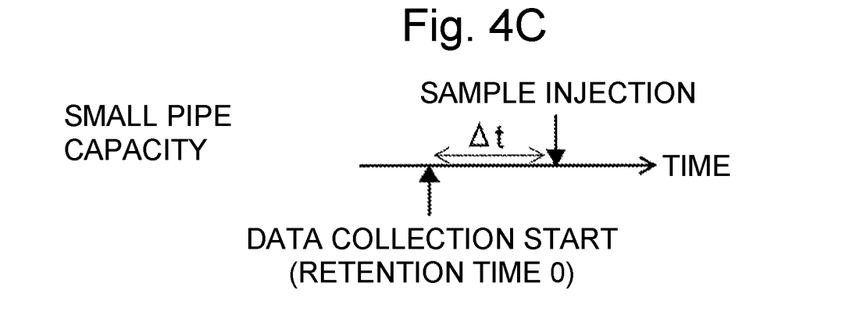
Figure 5A:
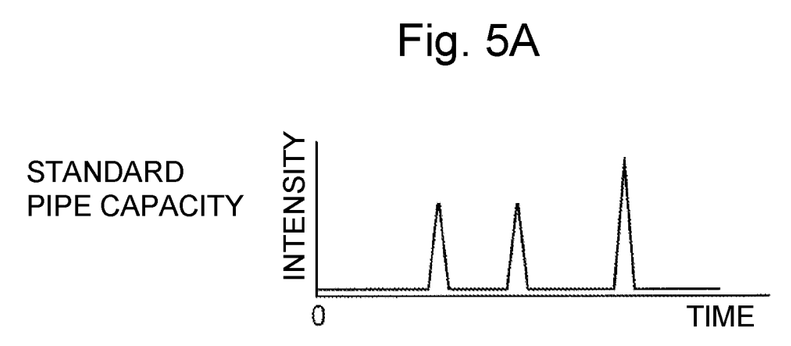
FIGS. 5A to 5C are diagrams showing examples of a chromatogram in the cases where pipe capacities are different.
Figure 5B:
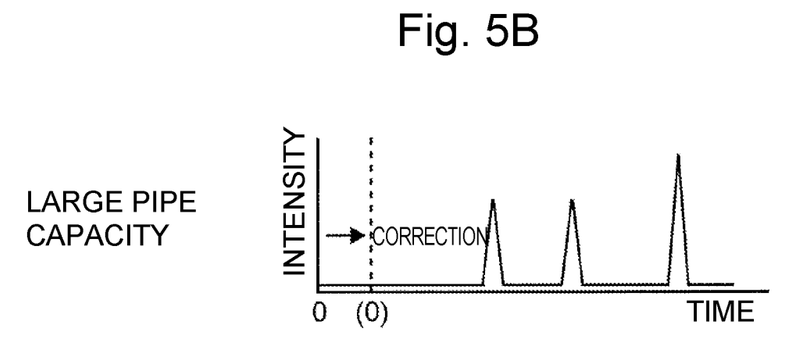
Figure 5C:
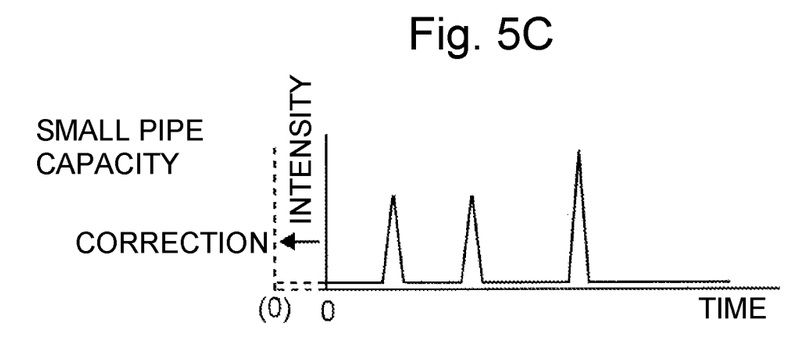

FIG. 1 is a schematic configuration diagram of an LC device according to the present embodiment; FIGS. 2A and 2B are schematic diagrams of configurations having different pipe capacities in the LC device shown in FIG. 1: FIG. 3 is a flowchart of a retention time shift correction process in the LC device of the present embodiment: FIGS. 4A to 4C are explanatory diagrams of the retention time shift correction process: and FIGS. 5A to 5C are conceptual diagrams of a chromatogram obtained by the retention time shift correction process.

As shown in FIG. 1, the LC device of the present embodiment includes a liquid supply pump 2 for suctioning a mobile phase from a mobile phase container 1 and supplying the suctioned mobile phase at a constant flow rate, an injector 3 for injecting a liquid sample into the supplied mobile phase, a column 4 for separating various kinds of components in the liquid sample, a column oven 5 for adjusting the temperature around the column 4, a detector 6 for detecting the components in an eluate that is eluted from the column 4, a control unit 7 for controlling operation of each unit, and a data processing unit 8 for receiving detection data obtained by the detector 6 and performing data processing. Further, an input unit 9 and a display unit 10 connected to the control unit 7 are user interfaces.

The control unit 7 includes a parameter receiving unit 71, a retention time shift calculation unit 72, and a time shift correction control unit 73 as functional blocks that are characteristic to the LC device of the present embodiment. Also, the data processing unit 8 includes a chromatogram data collection unit 81 and a chromatogram creation unit 82.

Here, a configuration may be adopted in which part of the control unit 7 and the data processing unit 8 are embodied by allowing a personal computer to execute exclusive-use controlling/processing software installed in the personal computer.

In the LC device of the present embodiment, the injector 3 injects a liquid sample into the mobile phase at a timing based on a command from the control unit 7. The injected liquid sample reaches the entrance of the column 4 by moving along the flow of the mobile phase. While the liquid sample passes through the inside of the column 4, various kinds of components in the sample are separated in a time direction. Further, an eluate containing the components separated in the column 4 exits from the column 4 exit and reaches the detector 6, and the detector 6 outputs detection data obtained by digitizing an intensity signal corresponding to the concentration (amount) of the introduced components.

In this LC device, the period of time T1 from the time point at which the liquid sample is injected by the injector 3 to the time point at which the injected liquid sample is introduced into the column 4 is dependent on the capacity of a pipe 11 that connects between the injector 3 and the column 4 entrance. Similarly, the period of time T2 from the time point at which a certain component is eluted from the column 4 exit to the time point at which the component is introduced into the detector 6 is dependent on the capacity of a pipe 12 that connects between the column 4 exit and the detector 6. For this reason, as shown in FIGS. 2A and 2B, when the pipes 11 and 12 are different in capacity, the periods of time T1 and T2 are also different, and this becomes a shift of the retention time for the same component. Specifically, assuming that the pipes 11a, 12a shown in FIG. 2A each have a reference pipe capacity, the pipes 11b, 12b shown in FIG. 2B each have a larger pipe capacity because of having a larger pipe length than those of FIG. 2A, provided that the inner diameter is the same. As a result, both T1 and T2 are longer than those of FIG. 2A, thereby generating a retention time shift.

Accordingly, in the LC device of the present embodiment, the retention time shift is corrected in the following manner.

First, before the start of analysis, the user inputs and sets separation conditions such as the mobile phase flow rate from the input unit 9. Further, the user inputs and sets either the pipe capacity difference or the retention time difference as a parameter for correction (step S1). Specifically, when the user performs a predetermined operation in the input unit 9, the parameter receiving unit 71 receives this and allows the display unit 10 to display a selection screen prompting the user to select which of the pipe capacity difference and the retention time difference is to be input as the parameter for correction. When the user selects one of these and inputs the pipe capacity difference or the retention time difference with a numerical value, the parameter receiving unit 71 stores the selection and the numerical value. Note that, regarding the polarity of the retention time difference, it is defined that the polarity is negative when the retention time is shorter than a predetermined reference retention time, and that the polarity is positive when the retention time is longer than the reference retention time.

The capacity of the pipes 11, 12 can be calculated based on the dimensions such as the inner diameter and length of those pipes. Thus, the user may perform such calculation beforehand and further calculate the difference from a standard pipe capacity (reference pipe capacity) as the pipe capacity difference. Also, instead of the calculation from dimensions, the pipe capacity may be experimentally calculated. Further, the retention time difference may be defined as the difference between the reference retention time and the retention time of a predetermined component obtained by performing an LC analysis on the component under predetermined separation conditions using the same device.

Next, when the user gives an instruction for start of the analysis from the input unit 9, the time shift correction control unit 73 receives the request of the start of analysis (step S2), and the time shift correction control unit 73 determines whether the input setting in step S1 is a retention time difference input or not (step S3). Further, when the input setting is a retention time difference input (Yes in step S3), the procedure skips step S4 to proceed to step S5. On the other hand, when the input setting is not a retention time difference input, that is, when the input setting is a pipe capacity difference input, the retention time shift calculation unit 72 calculates a retention time shift $\Delta t$ from A/B, where A represents the input pipe capacity difference, and B represents the mobile phase flow rate that is set as one of the separation conditions at that time (step S4). In other words, when the retention time difference is input, the retention time difference is defined as the retention time shift $\Delta t$ as it is, whereas when the pipe capacity difference is input, the retention time shift $\Delta t$ is determined by calculation based on the pipe capacity difference.

Subsequently, the time shift correction control unit 73 gives a sample injection preparation instruction to the injector 3 (step S5). In response to this instruction, the injector 3 takes a designated amount of the designated liquid sample and prepares the liquid sample on an injection line. The time shift correction control unit 73 repeatedly determines whether the sample injection preparation is completed or not (step S6) and, upon receipt of a notification from the injector 3 that the sample injection preparation is completed, the time shift correction control unit 73 determines whether the retention time shift $\Delta t$ to be corrected is a positive value or not (step S7).

The state that the retention time shift $\Delta t$ is a positive value means that the pipe capacity is larger than the reference pipe capacity, so that, in order to allow the retention time to meet the reference retention time, the time point at which the retention time is set to be zero needs to be delayed to be later than the sample injection time point. Accordingly, the time shift correction control unit 73 first gives an instruction of sample injection to the injector 3 (step S8). The liquid sample is thereby injected into the mobile phase from the injector 3. Thereafter, the time shift correction control unit 73 repeatedly determines whether a correction time corresponding to the retention time shift Δt has passed or not (step S9). Further, when the correction time has passed, the time shift correction control unit 73 gives an instruction to the data processing unit 8 for substantial data collection start (step S10). The term "substantial data collection" as used herein means collection of data that is reflected on the chromatogram, and the time point at which substantial data collection is started is the retention time zero, that is, the starting point of the chromatogram. The relationship in timing between the sample injection at this time and the substantial data collection start is shown in FIG. 4B.

On the other hand, the state that the retention time shift Δt is a negative value means that the pipe capacity is smaller than the reference pipe capacity, so that, in order to allow the retention time to meet the reference retention time, the sample injection time point needs to be delayed to be later than the time point at which the retention time is set to be zero. Accordingly, when the determination in step S7 is "No", the time shift correction control unit 73 first gives an instruction to the data processing unit 8 for substantial data collection start (step S11). This allows the chromatogram data collection unit 81 in the data processing unit 8 to start storing the detection data obtained in the detector 6 as chromatogram data, and the chromatogram creation unit 82 starts to create a chromatogram of real time based on the obtained chromatogram data. The time shift correction control unit 73 repeatedly determines whether a correction time corresponding to the retention time shift Δt has passed from that time or not (step S12). Further, when the correction time has passed, the time shift correction control unit 73 gives an instruction of sample injection to the injector 3 (step S13). The liquid sample is thereby injected into the mobile phase from the injector 3. The relationship in timing between the sample injection at this time and the substantial data collection start is shown in FIG. 4C.

After the process of step S10 or step S13 is finished, the control unit 7 repeatedly determines whether the analysis is to be ended or not by determining whether the analysis end conditions defined beforehand are satisfied or not (step S14). For example, the analysis may be ended at the time point at which a defined analysis time has passed from the sample injection time point. Further, when it is determined that the analysis is ended, whether a next request for analysis is present or not is determined (step S15). If a request for analysis is present, the procedure returns to step S2, whereas if a request for analysis is not present, the analysis is ended as it is.

When timing control as shown in FIG. 4B is carried out by the above process, the retention time zero is shifted backward (direction of lateness in time) as compared with the case in which the sample injection and the substantial data collection start are carried out at the same time as shown in FIG. 4A. Accordingly, as shown in FIG. 5B, the chromatogram having a start point at the retention time zero is shifted forward as compared with the case in which the retention time is not corrected, and the retention time shift caused by relatively large pipe capacity is corrected.

On the other hand, when timing control as shown in FIG. 4C is carried out, the retention time zero is shifted forward (direction of earliness in time) as compared with the case in which the sample injection and the substantial data collection start are carried out at the same time as shown in FIG. 4A. Accordingly, as shown in FIG. 5C, the chromatogram having a start point at the retention time zero is shifted backward as compared with the case in which the retention time is not corrected, and the retention time shift caused by relatively small pipe capacity is corrected.

In this manner, it is possible to obtain a chromatogram in which the shift of retention time caused by difference in the pipe capacity of the pipes 11, 12 is corrected, whereby the components can be identified, for example, using the same database. Also, a plurality of chromatograms can be compared as they are and, if a peak is present at around the same time point, it can be easily inferred that the same component is contained.

Note that, each embodiment described above is merely one example of the present invention, and it is apparent that suitable changes, modifications, and additions made within the range of the gist of the present invention are all encompassed within the scope of the claims of the present application.

REFERENCE SIGNS LIST

1 . . . Mobile Phase Container
2 . . . Liquid Supply Pump
3 . . . Injector
4 . . . Column
5 . . . Column Oven
6 . . . Detector
7 . . . Control Unit
71 . . . Parameter Receiving Unit
72 . . . Retention Time Shift Calculation Unit
73 . . . Time Shift Correction Control Unit
8 . . . Data Processing Unit
81 . . . Chromatogram Data Collection Unit
82 . . . Chromatogram Creation Unit
9 . . . Input Unit
10 . . . Display Unit
11, 11a, 11b, 12, 12a, 12b . . . Pipes

The invention claimed is:
1. A liquid chromatogram device comprising:
a liquid supplier for supplying a mobile phase;
a sample injector for injecting a sample into the supplied mobile phase;
a column for temporally separating components contained in the sample;
a detector for detecting the components in an eluate that is eluted from an exit of the column; and
a signal processor for creating a chromatogram based on a detection signal sent from the detector,
wherein the liquid chromatogram device further comprises:
a) a pipe information setter configured to allow a user to set pipe information related to a capacity of a pipe from the sample injector to an entrance of the column and/or a pipe from the exit of the column to the detector;
b) a retention time shift calculator configured to calculate a shift of retention time from a reference retention time that is given when the capacity of the pipe is a predetermined reference capacity, based on the pipe information and a mobile phase flow rate that is determined as a separation condition at a time of an analysis; and
c) a controller configured to control the sample injection unit and the signal processor so as to adjust a timing at which the sample is injected into the mobile phase in the sample injector and a timing at which the retention time is assumed to be zero on the chromatogram that is created in the signal processor, in accordance with the shift of retention time that is calculated by the retention time shift calculator.

2. The liquid chromatogram device according to claim 1, wherein the pipe information setter enables selection of which of the pipe information and the shift of retention time is to be set, and sets the pipe information in correspondence with the selection of setting of the pipe information and sets the shift of retention time in correspondence with the selection of setting of the shift of retention time; and the controller uses the set shift of retention time for control in place of the shift of retention time calculated by the retention time shift calculation unit when the shift of retention time is set by the pipe information setting unit.

* * * * *